United States Patent
Osterhout et al.

(10) Patent No.: US 6,496,362 B2
(45) Date of Patent: Dec. 17, 2002

(54) METHOD AND APPARATUS FOR PROTECTING A HARD DISK DRIVE FROM SHOCK

(75) Inventors: Ryan D. Osterhout, Layton, UT (US); Scott P. Thomas, Ogden, UT (US); Paul C. Kunz, Ogden, UT (US); Allen T. Bracken, Layton, UT (US)

(73) Assignee: Iomega Corporation, Roy, UT (US)

(*) Notice: Subject to any disclaimer, the term of this patent is extended or adjusted under 35 U.S.C. 154(b) by 46 days.

(21) Appl. No.: 09/858,073

(22) Filed: May 14, 2001

(65) Prior Publication Data

US 2002/0167792 A1 Nov. 14, 2002

(51) Int. Cl.[7] .............. H05K 5/02; H05K 7/12; B65D 81/113
(52) U.S. Cl. .......... 361/685; 361/728; 248/638; 312/223.2; 206/586
(58) Field of Search ............... 361/679–686, 361/727–728; 345/905; 248/638, 917; 312/223.1, 223.2; D14/478; 206/433, 521, 586, 521.6, 521.7

(56) References Cited

U.S. PATENT DOCUMENTS

| | | |
|---|---|---|
| 2,278,280 A | 3/1942 | Pfeiffer et al. |
| 2,896,833 A | 7/1959 | Markham |
| 3,144,236 A | 8/1964 | Clanin |
| 3,692,264 A | 9/1972 | Burkhard et al. |
| 3,695,421 A | 10/1972 | Wood |
| 4,061,228 A | 12/1977 | Johnson |
| 4,062,049 A | 12/1977 | Dirks |
| 4,359,762 A | 11/1982 | Stollorz |
| 4,414,576 A | 11/1983 | Randmae |
| 4,507,689 A | 3/1985 | Kozuki |
| 4,550,343 A | 10/1985 | Nakatani |
| 4,562,500 A | 12/1985 | Bygdnes |
| 4,622,607 A | 11/1986 | Smith, II |
| 4,639,863 A | 1/1987 | Harrison |
| 4,683,520 A * | 7/1987 | Grassens et al. .............. 211/26 |

(List continued on next page.)

FOREIGN PATENT DOCUMENTS

| | | | |
|---|---|---|---|
| DE | 4110399 A1 * | 10/1992 | ............. G06F/1/16 |
| DE | 43 04 506 | 8/1994 | |
| EP | 0 204 299 | 12/1986 | |

(List continued on next page.)

OTHER PUBLICATIONS

"IBM Travelstar E—External Hard Disk Drive—Installation and Operation Guide", IBM Storage Systems Division, San Jose, California, 2000, 10 sheets.

(List continued on next page.)

Primary Examiner—Anatoly Vortman
(74) Attorney, Agent, or Firm—Baker Botts L.L.P.

(57) ABSTRACT

An information storage device (10) includes a cartridge (14) which can be removably inserted into a cradle (13) coupled by a cable (12) to a host computer. The cartridge includes an outer housing (54) containing a chamber (122), and having an electrical connector (63) on the exterior. An inner housing (128) contains a hard disk mechanism, and is resiliently supported within the chamber by four resilient elements (131–134). A flex circuit (146) extends from the inner housing to the connector, and permits relative movement of the inner and outer housings. The resilient elements are formed by cutting a cross-shaped part (402) from a foam sheet, cutting two square parts (406–407) from a different foam sheet, adhesively laminating the outer parts to opposite sides of the center part, and then cutting the resulting assembly along two planes to form the four resilient elements.

20 Claims, 6 Drawing Sheets

U.S. PATENT DOCUMENTS

| | | | |
|---|---|---|---|
| 4,688,206 A | | 8/1987 | Nakagawa et al. |
| 4,705,257 A | * | 11/1987 | Leo et al. .................... 248/201 |
| 4,709,817 A | | 12/1987 | Keady |
| 4,712,146 A | | 12/1987 | Moon |
| 4,724,500 A | | 2/1988 | Dalziel |
| 4,749,164 A | * | 6/1988 | Leo et al. .................. 248/27.3 |
| 4,754,397 A | | 6/1988 | Varaiya et al. |
| 4,763,225 A | | 8/1988 | Frenkel et al. |
| 4,769,764 A | | 9/1988 | Levanon |
| 4,791,511 A | | 12/1988 | Davis |
| 4,806,106 A | | 2/1989 | Mebane |
| 4,833,554 A | | 5/1989 | Dalziel et al. |
| 4,853,807 A | | 8/1989 | Trager |
| 4,856,656 A | | 8/1989 | Sugimoto et al. |
| 4,869,369 A | | 9/1989 | Turngren |
| 4,884,261 A | | 11/1989 | Dalziel |
| 4,893,210 A | | 1/1990 | Mintzlaff |
| 4,893,263 A | | 1/1990 | Myers |
| 4,896,777 A | * | 1/1990 | Lewis ......................... 211/26 |
| 4,908,715 A | | 3/1990 | Krum |
| 4,926,291 A | | 5/1990 | Sarraf |
| 4,937,806 A | * | 6/1990 | Babson et al. .............. 360/137 |
| 4,965,691 A | | 10/1990 | Iftikar et al. |
| 4,974,103 A | | 11/1990 | Iftikar et al. |
| 5,002,368 A | * | 3/1991 | Anglin ....................... 248/634 |
| 5,004,207 A | * | 4/1991 | Ishikawa et al. ............ 248/632 |
| 5,024,328 A | | 6/1991 | Bontrager |
| 5,025,335 A | | 6/1991 | Stefansky |
| 5,041,924 A | * | 8/1991 | Blackborow et al. ....... 360/137 |
| 5,065,262 A | | 11/1991 | Blackborow |
| 5,084,791 A | | 1/1992 | Thanos |
| 5,128,830 A | * | 7/1992 | Deluca et al. .............. 361/687 |
| 5,160,473 A | | 11/1992 | Bontrager |
| 5,170,300 A | | 12/1992 | Stefansky |
| 5,175,657 A | | 12/1992 | Iftikar et al. |
| 5,204,794 A | | 4/1993 | Yoshida |
| 5,207,327 A | | 5/1993 | Brondos |
| 5,214,550 A | | 5/1993 | Chan |
| 5,223,996 A | * | 6/1993 | Read et al. ............... 360/97.02 |
| 5,235,481 A | | 8/1993 | Kamo et al. |
| 5,241,436 A | | 8/1993 | Kawabata |
| H1245 H | | 10/1993 | Griswold et al. |
| 5,253,129 A | | 10/1993 | Blackborow et al. |
| 5,258,888 A | | 11/1993 | Korinsky |
| 5,303,101 A | | 4/1994 | Hatch et al. |
| 5,317,464 A | | 5/1994 | Witt et al. |
| 5,359,504 A | | 10/1994 | Ohmi et al. |
| 5,363,227 A | * | 11/1994 | Ichikawa et al. ............. 349/56 |
| 5,363,276 A | * | 11/1994 | Crockett .................... 174/52.1 |
| 5,372,515 A | | 12/1994 | Miller et al. |
| 5,392,197 A | | 2/1995 | Cuntz et al. |
| 5,400,193 A | * | 3/1995 | Moser et al. ............... 248/560 |
| 5,402,308 A | * | 3/1995 | Koyanagi et al. ........... 361/685 |
| 5,408,383 A | | 4/1995 | Nagasaka et al. |
| 5,412,522 A | | 5/1995 | Lockhart et al. |
| 5,426,562 A | | 6/1995 | Morehouse et al. |
| 5,436,857 A | | 7/1995 | Nelson et al. |
| 5,438,162 A | | 8/1995 | Thompson et al. |
| 5,444,586 A | | 8/1995 | Iftikar et al. |
| 5,448,433 A | | 9/1995 | Morehouse |
| 5,452,159 A | | 9/1995 | Stefansky |
| 5,463,527 A | * | 10/1995 | Hager et al. ................ 248/581 |
| 5,479,285 A | * | 12/1995 | Burke ........................ 248/638 |
| 5,532,889 A | | 7/1996 | Stefansky et al. |
| 5,550,712 A | * | 8/1996 | Crockett .................... 174/52.1 |
| 5,585,986 A | | 12/1996 | Parkin |
| 5,631,788 A | | 5/1997 | Richards |
| 5,663,855 A | | 9/1997 | Kim et al. |
| 5,715,169 A | | 2/1998 | Noguchi |
| 5,724,216 A | | 3/1998 | Iftikar et al. |
| 5,739,995 A | | 4/1998 | Ohmi et al. |
| 5,754,357 A | | 5/1998 | Anderson et al. |
| 5,793,207 A | | 8/1998 | Gill |
| 5,808,830 A | | 9/1998 | Stefansky |
| 5,808,866 A | | 9/1998 | Porter |
| 5,809,520 A | | 9/1998 | Edwards et al. |
| 5,812,373 A | | 9/1998 | Hwang |
| 5,831,788 A | | 11/1998 | Hofland |
| 5,837,934 A | * | 11/1998 | Valavanis et al. .......... 174/52.1 |
| 5,943,193 A | | 8/1999 | Thayne et al. |
| 5,943,208 A | * | 8/1999 | Kato et al. .............. 248/222.11 |
| 5,949,630 A | | 9/1999 | Yamamoto et al. |
| 5,995,365 A | * | 11/1999 | Broder et al. ................ 361/685 |
| 5,999,406 A | | 12/1999 | McKain et al. |
| 6,021,029 A | | 2/2000 | Mamiya et al. |
| 6,025,973 A | | 2/2000 | Mizoshita et al. |
| 6,028,744 A | | 2/2000 | Amirkiai et al. |
| 6,082,543 A | | 7/2000 | Béliveau |
| 6,144,552 A | * | 11/2000 | Whitcher et al. ............ 248/917 |
| 6,154,360 A | | 11/2000 | Kaczeus, Sr. et al. |
| 6,259,573 B1 | | 7/2001 | Tsuwako et al. |
| 6,304,440 B1 | * | 10/2001 | Lin ............................. 248/581 |
| 6,320,744 B1 | * | 11/2001 | Sullivan et al. ........... 312/223.2 |
| 6,324,054 B1 | * | 11/2001 | Chee et al. ................. 248/635 |
| 2002/0044416 A1 | * | 4/2002 | Harmon et al. ............. 361/685 |

FOREIGN PATENT DOCUMENTS

| | | | | |
|---|---|---|---|---|
| EP | 0 210 497 | | 2/1987 | |
| EP | 0 335 490 | | 10/1989 | |
| EP | 0 426 414 | | 5/1991 | |
| FR | 2 691 435 | | 11/1993 | |
| GB | 2 228 819 | | 9/1990 | |
| GB | 2 243 940 | | 11/1991 | |
| JP | 62-259284 | | 11/1987 | |
| JP | 1-189091 | | 7/1989 | |
| JP | 06236669 A | * | 8/1994 | ........... G11B/33/02 |
| WO | WO 93/24932 | | 12/1993 | |
| WO | WO 9906902 A1 | * | 2/1999 | ............. G06F/1/16 |

OTHER PUBLICATIONS

Thomas A. Wilke, U.S. Ser. No. 09/590,508 filed Jun. 9, 2000 (Attorney Docket Nos. 067470.0104, P0622).

Thomas A. Wilke, U.S. Ser. No. 09/591,081 filed Jun. 9, 2000 (Attorney Docket Nos. 067470.0105, P0623).

Thomas A. Wilke, Allen T. Bracken, Ser. No. 09/591,354 filed Jun. 9, 2000 (Attorney Docket Nos. 067470.0106, P0624).

Thomas A. Wilke, Allen T. Bracken, Brent J. Watson, Fred C. Thomas III, U.S. Ser. No. 09/591,074 filed Jun. 9, 2000 (Attorney Docket Nos. 067470.0107, P0625).

Thomas A. Wilke, Marvin R. DeForest, Dennis D. Ogden, Ser. No. 09/591,540 filed Jun. 9, 2000 (Attorney Docket Nos. 067470.0108, P0626).

Allen T. Bracken, Mark L. Reimann, Theodore J. Smith, U.S. Ser. No. 09/591,538 filed Jun. 9, 2000 (Attorney Docket Nos. 067470.0113, P0627).

Jeffrey D. Penman, Todd R. Shelton, U.S. Ser. No. 09/590,509 filed Jun. 9, 2000 (Attorney Docket Nos. 067470.0114, P0628).

Randall C. Bauck, U.S. Ser. No. 09/590,498, filed Jun. 9, 2000 (Attorney Docket Nos. 067470.0115, P0629).

Randall C. Bauck, Allen T. Bracken, Thomas A. Wilke, David S. Greenhalgh, U.S. Ser. No. 09/590,511 filed Jun. 9, 2000 (Attorney Docket Nos. 067470.0116, P0630).

Daniel D. Rochat, Mark L. Reimann, Allen T. Bracken, U.S. Ser. No. 09/746,304 filed Dec. 21, 2000 (Attorney Docket Nos. 067470.0121, P0659).

Allen T. Bracken, Theodore J. Smith, Jeffrey D. Pennman, Todd R. Shelton, David S. Greenhalgh; Paul E. Jacobs, Spencer W. Stout, Paul C. Kunz, Scott P. Thomas, Douglas S. Reynolds, David L. Jolley, Ryan D. Osterhout, U.S. Ser. No. 09/755,961 filed Jan. 4, 2001 (Attorney Docket Nos. 067470.0125, P0751).

Paul C. Kunz, U.S. Ser. No. 09/854,354, filed May 11, 2001 (Attorney Docket Nos. 067470.0128, P0718).

Paul C. Kunz, Ryan D. Osterhout, Theodore J. Smith, Spencer W. Stout, Scott P. Thomas, U.S. Ser. No. 09/854,391 filed May 11, 2001 (Attorney Docket Nos. 067470.0128, P0718).

Fred C. Thomas III, U.S. Ser. No. 09/839,515, filed Apr. 20, 2001 (Attorney Docket Nos. 067470.0137, P0766).

Todd R. Shelton, Theodore J. Smith, Marvin R. DeForest, Kelly D. Wright, Mark L. Reimann, Hiromichi (nmi) Oribe, Jeffrey D. Penman, U.S. Ser. No. 09/855,993, filed May 14, 2001 (Attorney Docket Nos. 067470.0144, P0784).

William P. Baker, Todd R. Shelton, Theodore J. Smith, U.S. Ser. No. 09/866,568 filed May 25, 2001 (Attorney Docket Nos. 067470.0146, P0791).

* cited by examiner

METHOD AND APPARATUS FOR PROTECTING A HARD DISK DRIVE FROM SHOCK

TECHNICAL FIELD OF THE INVENTION

This invention relates in general to techniques for protecting a hard disk drive mechanism from mechanical shock and, more particularly, to techniques for protecting a hard disk drive mechanism from mechanical shock when the mechanism is disposed in a removable data storage cartridge.

BACKGROUND OF THE INVENTION

Computer technology has evolved very rapidly over the past twenty-five years. One aspect of this evolution has been a progressively increasing demand for progressively more storage capacity in removable data storage cartridges. For example, floppy disks capable of storing approximately 360 KB of data gave way to floppy disks capable of storing 720 KB, which in turn gave way floppy disks capable of storing approximately 1.44 MB of data.

Thereafter, removable data storage cartridges with still higher storage capacities became commercially available, for example in the form of cartridges available under the tradename ZIP from Iomega Corporation of Roy, Utah, which is the assignee of the present application. ZIP cartridges provide data storage capacities on the order of 100 MB to 250 MB. Still another significant increase in storage capacity was subsequently realized when Iomega introduced removable cartridges under the tradename JAZ, which has storage capacities on the order of 1 GB to 2 GB. Nevertheless, the demand for still greater storage capacity in removable cartridges continues to progressively increase, such that there is a current demand for cartridges capable of storing 5 GB to 20 GB, or even more.

One approach to such a high-capacity cartridge involves the use within the cartridge of a high-capacity hard disk drive mechanism. There are pre-existing removable cartridges which include a sealed hard disk drive mechanism. Such a hard disk drive mechanism typically includes a sealed housing containing not only a rotatable storage medium in the form of a hard disk, but also a motor for rotating the disk, at least one read/write head, and a mechanism for effecting movement of the read/write head relative to and adjacent the disk. While these pre-existing cartridges have been generally adequate for their intended purposes, they have not been satisfactory in all respects.

In this regard, hard disk drive mechanisms are very sensitive to vibration and mechanical shock, and this sensitivity is particularly acute in high-capacity hard disk drive mechanisms. When such a hard disk drive mechanism is incorporated into a removable cartridge, and since a cartridge of this type can be easily dropped whenever it is not inserted into a drive, there is a high potential for significant mechanical shock or vibration that can damage either the read/write head and/or the rotatable disk of the hard disk drive mechanism.

A further consideration is that, in order for any removable data storage cartridge to have a high degree of commercial success, it must be possible to sell it at a relatively low price, which in turn means that it must be possible to fabricate it at a relatively low price. Consequently, any type of structure provided in the cartridge to offer protection from shocks must be relatively inexpensive, one aspect of which is that there must be an efficient and inexpensive way to manufacture that structure.

SUMMARY OF THE INVENTION

From the foregoing it may be appreciated that a need has arisen for a technique that provides a data storage mechanism in a removable cartridge with a high level of protection from shock and vibration. According to the present invention, a method and apparatus are provided to address this need, and involve: providing a data storage portion within an inner housing, the inner housing having first and second surface portions on opposite sides of the exterior thereof and having a side surface portion which extends between peripheral edges of the first and second surface portions; locating the inner housing in a chamber within an outer housing; transporting signals that include data between the data storage section and a location external to the outer housing; and resiliently supporting the inner housing within the chamber using a plurality of resilient elements disposed within the chamber. This resilient support of the inner housing involves: positioning the resilient elements at spaced locations along a periphery of the inner housing; configuring each of the resilient elements to include first and second outer portions which are coupled to opposite sides of a center portion; causing the center portion to engage the side surface portion of the inner housing and the first and second outer portions to respectively engage the first and second surface portions of the inner housing; selecting for the center portion a material having a first compression characteristic; selecting for the first outer portion a material having a second compression characteristic different from the first compression characteristic; and selecting for the second outer portion a material having a third compression characteristic different from the first compression characteristic.

It will also be appreciated that, as to structure which provides shock and vibration protection for an inner housing disposed within an outer housing, there is a need for a technique to efficiently and inexpensively fabricate this protective structure. According to a different form of the present invention, a method is provided to address this need, and involves: cutting from a first sheet of resilient material a center part having a plurality of arms projecting outwardly in respective different directions; cutting from a second sheet of resilient material a first outer part; cutting from a third sheet of resilient material a second outer part; adhesively securing the first and second outer parts to opposite sides of the center part to form an assembly, each of the outer parts having portions which project outwardly beyond the center part in the region between each adjacent pair of the arms thereof; cutting the assembly along a plurality of cutting planes to subdivide the assembly into a plurality of resilient elements, the cutting planes each being perpendicular to the planes of lamination between the outer parts and the center part, and each being oriented so that each of the arms of the center part is split in a lengthwise direction into two portions of approximately equal width; and using a set of the resilient elements to resiliently support an inner housing within an outer housing, the resilient elements of the set being disposed at spaced locations along a periphery of the inner housing.

BRIEF DESCRIPTION OF THE DRAWINGS

A better understanding of the present invention will be realized from the detailed description which follows, taken in conjunction with the accompanying drawings, in which.

DETAILED DESCRIPTION

Figure 1:
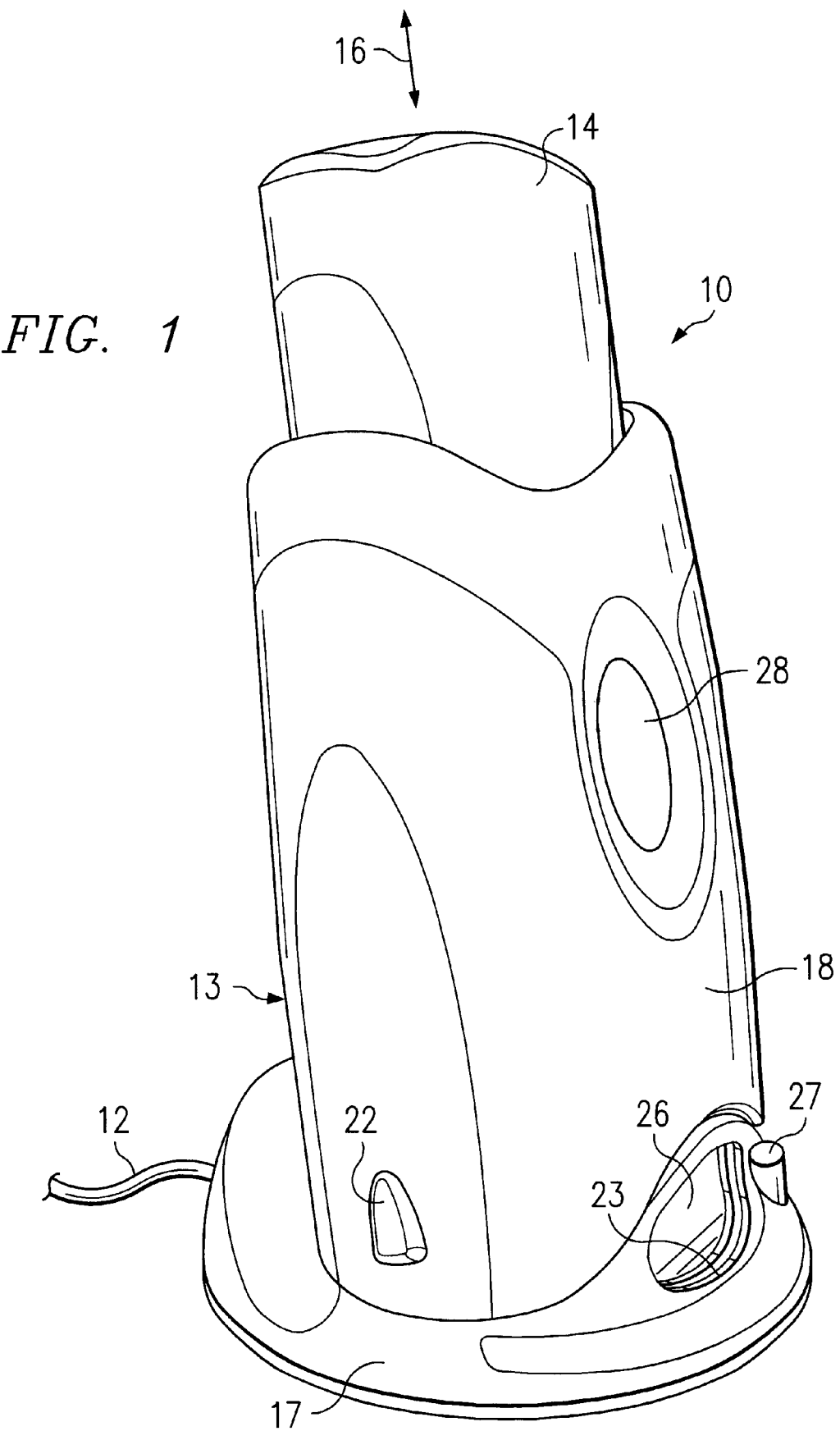
FIG. 1 is a diagrammatic perspective view of an information storage device which embodies aspects of the present invention.

FIG. 1 is a diagrammatic perspective view showing an information storage device 10 which embodies aspects of the present invention, and which can be coupled by a cable 12 to a host computer system that is not illustrated. The information storage device 10 includes a receiving unit or cradle 13, and includes an information storage cartridge 14 which is removably inserted into the cradle 13. The cartridge 14 is inserted into and removed from the cradle 13 in directions which are almost vertical, as indicated by a double-headed arrow 16.

The cradle 13 includes a base or interface module 17, and a drive module 18. The interface module 17 and drive module 18 are physically separate modules that are releasably coupled to each other by a not-illustrated coupling mechanism. An understanding of the coupling mechanism is not needed in order to understand the present invention, and the coupling mechanism is therefore not illustrated and described here in detail. Two manually operable release buttons are provided on opposite sides of the drive module 18, and one of these two buttons is visible at 22 in FIG. 1. When the two release buttons 22 are simultaneously manually pressed, the detachable coupling between the drive module 18 and the interface module 17 is released, so that they can be separated.

The interface module 17 has a window 23 provided through a front wall portion thereof. A liquid crystal display (LCD) 26 is provided on the drive module 18, and is visible through the window 23 of the interface module 17 when these two modules are releasably coupled to each other. A manually operable eject button 27 is provided on the interface module 17. When the eject button 27 is manually pressed downwardly, the interface module 17 sends the drive module 18 an electrical signal, and this electrical signal causes the drive module 18 to release a locking mechanism that holds the cartridge 14 in place, and to then effect a partial ejection of the cartridge 14.

The drive module 18 has an opening through a front wall thereof, in which is mounted a magnifying lens 28. When the cartridge 14 is removably inserted into the cradle 13, a label on the cartridge 14 can be viewed through the lens 28.

Figure 2:
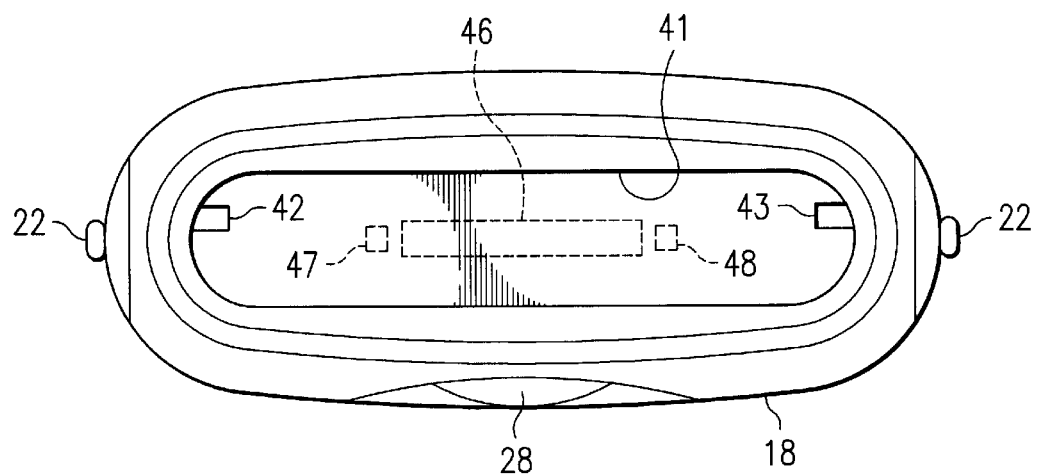
FIG. 2 is a diagrammatic top view of a drive module which is a component of the information storage device of FIG. 1.

FIG. 2 is a diagrammatic top view of the drive module 18, looking down into a vertical recess 41 that can removably receive the cartridge 14 (FIG. 1). On opposite sides of the recess 41 are two guide rails 42 and 43, which extend approximately vertically down into the recess 41 lengthwise thereof, and which project inwardly into the recess 41 from opposite sides thereof. The guide rails 42–43 are each slightly offset from the center of the recess 41, in a direction normal to an imaginary plane extending through the guide rails.

At the bottom of the recess 41 is a connector 46, which is shown diagrammatically in broken lines in FIG. 2. On opposite sides of the connector 46 are two movably supported latching pawls 47 and 48. The pawls 47 and 48 are each shown diagrammatically by broken lines in FIG. 2, and are each supported for limited movement toward and away from the connector 46.

Figure 3:
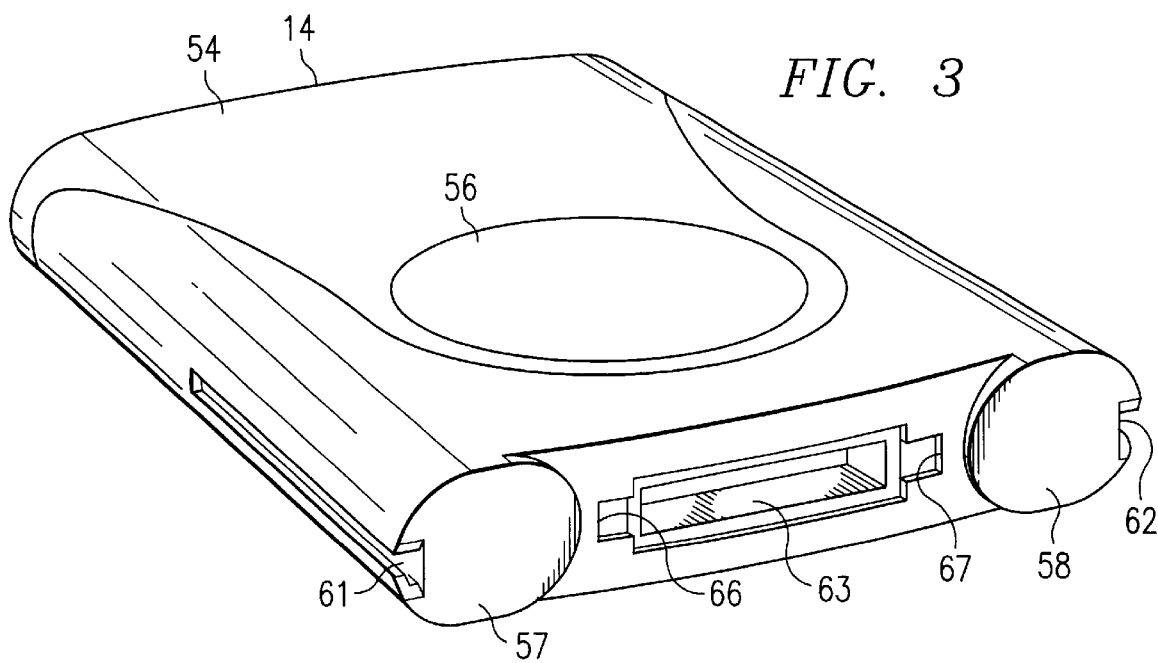
FIG. 3 is a diagrammatic perspective view of a removable data storage cartridge which is a component of the information storage device of FIG. 1.

FIG. 3 is a diagrammatic perspective view of the cartridge 14 by itself. The cartridge 14 has an outer housing 54. The cartridge 14 has on one side of the housing 54 a label 56, which carries indicia that is not shown in FIG. 3. When the cartridge 14 is removably inserted into the cradle 13, as shown in FIG. 1, the indicia on the label 56 is visible through the magnifying lens 28.

The cartridge housing 54 has at one end two spaced and outward projections 57 and 58. The housing 54 has on opposite sides thereof two elongate grooves 61 and 62. The grooves 61 and 62 each extend approximately half the length of the cartridge 14, beginning from the end surface of a respective one of the projections 57 and 58. As evident from FIG. 3, the sidewalls of the grooves 61–62 are flared slightly at the ends of the grooves adjacent to the projections 57–58. Also, the grooves 61 and 62 are each offset slightly with respect to the center of the cartridge 14, in a direction normal to an imaginary plane extending between and parallel to the grooves 61–62. Between the projections 57 and 58, in an end surface of the cartridge 14, is a connector 63. On opposite sides of the connector 63, the cartridge housing 54 has two openings or recesses 66 and 67.

With reference to FIGS. 2 and 3, the guide rails 42–43 and the grooves 61–62 ensure that there is only a single orientation in which the cartridge 14 can be inserted into the recess 41. In particular, since the grooves 61–62 only extend approximately half the length of the cartridge 14, it is not possible to insert the wrong end of the cartridge 14 very far into the recess 41, because the guide rails 42–43 will engage an end surface of the cartridge 14 and thereby prevent further insertion of the cartridge 14 with that orientation.

Moreover, even when the correct end of the cartridge 14 is introduced into the recess 41, the cartridge 14 must be oriented so that the label 56 thereon is facing in the same direction as the lens 28 on the drive module 18. This is because, as discussed above, the guide rails 42–43 are offset slightly with respect to a center of the recess 41, and the grooves 61–62 are offset slightly with respect to a center of the cartridge 14. If the label 56 is facing in a direction opposite from the direction in which the lens 28 is facing, there will be a mechanical interference between the guide rails 42–43 and the end surfaces of the projections 57–58, which will occur after the cartridge has been partially inserted, so as to prevent any further insertion movement of the cartridge 14 into the recess 41.

When the cartridge 14 is inserted into the recess 41 with the proper orientation, the flared side surfaces at the ends of the grooves 61–62 help guide the upper end of each guide rail 42–43 into the associated groove 61 or 62. Thereafter, the guide rails 42–43 and the grooves 61–62 cooperate in a manner which serves two functions, as follows.

First, their cooperation ensures that the connectors 46 and 63 will be accurately aligned with each other as they move into engagement. Second, their cooperation has the effect of positioning the cartridge 14 within the recess 41 in a manner so that the exterior surfaces of the cartridge 14 are spaced from and do not rub against the internal surfaces of the recess 41, except to the extent that surfaces on the guide rails 42–43 engage surfaces within the grooves 61–62. Thus, even after the cartridge 14 has been inserted into and removed from the drive module 18 many times, most of the exterior surfaces of the cartridge 14 will still look very new, rather than being highly scuffed.

As the cartridge 14 is being removably inserted into the recess 41, and as the connectors 46 and 63 move into mating engagement, the pawls 47 and 48 of the drive module 18 respectively move into the recesses 66 and 67, and are temporarily deflected inwardly by edges of the recesses as they enter the recesses. Then, as the connectors 46 and 63 reach proper mating engagement, the pawls 47 and 48 reach positions where they move outwardly so that locking edges thereon engage edges of the recesses 66–67 in a manner which prevents manual withdrawal of the cartridge 14 from the drive module 18.

In order to remove the cartridge 14 from the drive module 18 in a normal manner, an operator manually presses the eject button 27 on the interface module 17 (FIG. 1). In response to actuation of the eject button 27, not-illustrated circuitry within the interface module 17 transmits an electrical signal through the connectors 46 and 63 to the drive module 18. The drive module 18 has a not-illustrated release mechanism which then moves each of the pawls 47 and 48 inwardly toward the connector 46, until they are released from latching engagement with the recesses 66 and 67. The release mechanism then moves the cartridge 14 upwardly a sufficient distance relative to the drive module 18 so as to effect disengagement of the connector 63 from the connector 46. The user can then manually lift the cartridge 14 out of the recess 41 in the cradle 13.

Figure 4:
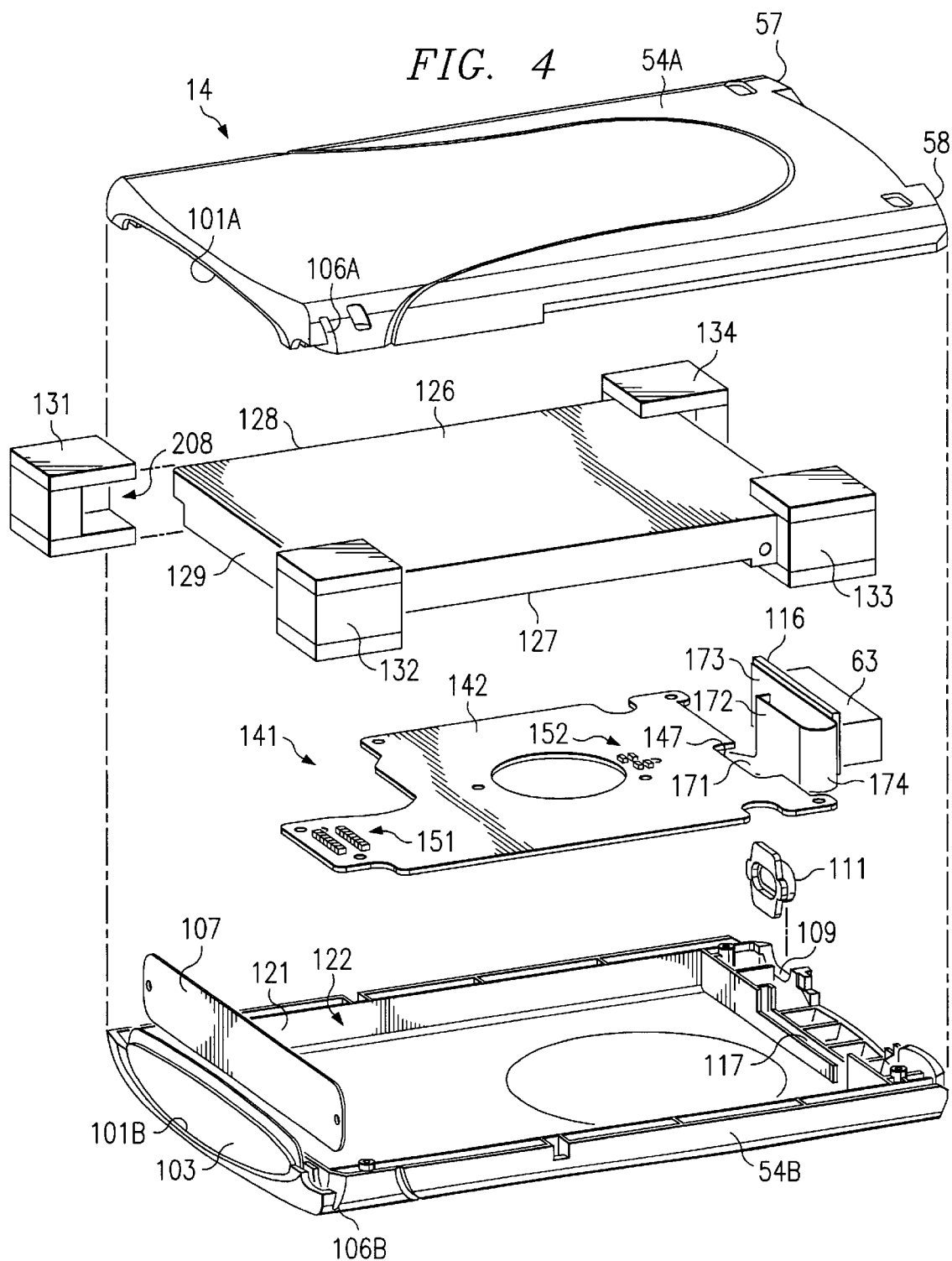
FIG. 4 is a diagrammatic exploded perspective view of the cartridge of FIG. 3.

FIG. 4 is a diagrammatic exploded perspective view of the cartridge 14. It will be noted that the left end of the cartridge 14 in FIG. 4 is the top end when the cartridge 14 is removably inserted into the cradle 13, and the lower part of the cartridge 14 in FIG. 4 is the front side when the cartridge is in the cradle 13. In the discussion which follows, reference to the top, bottom, front or back of the cartridge 14 should be understood to be references to its orientation when in the cradle 13.

As shown in FIG. 4, the outer housing 54 of the cartridge has two separate parts 54A and 54B that are each made from a high-impact plastic of a known type which is resistant to damage if subjected to a mechanical impact or shock. During assembly of the cartridge 14, the housing parts 54A and 54B are fixedly coupled to each other, for example by not-illustrated screws, by a suitable adhesive of a known type, by fusing edges of the plastic material of both parts together, or by some other suitable technique.

In an end of the housing opposite from the projections 57 and 58, the housing parts 54A and 54B have structure 101A and structure 101B which, when the housing parts are secured together, cooperate to define an oval-shaped opening that has an inwardly-facing slot extending around the entire periphery of the opening. An oval-shaped plastic lens 103 is disposed in the oval opening, and has an outwardly-projecting peripheral edge which is received in the slot around the opening, in order to retain the lens 103 within the opening 101.

The housing parts 54A and 54B also have portions 106A and 106B that cooperate to define a slot located behind the lens 103. The slot opens outwardly through one side of the housing 54A. A label 107 can be slidably inserted into and removed from the slot, and indicia on the label 107 can be viewed through the lens 103 when the label 107 is disposed in the slot.

The housing parts 54A and 54B also have respective structural portions in the region of the projection 57, which cooperate to define a second and smaller oval-shaped opening 109 that has a peripheral slot. A phosphor tag 111 is made of a material having a degree of phosphorescence, and has edges which are disposed in this slot around opening 109, so as to retain the tag 111 in the opening 109. The purpose of the phosphor tag 111 is discussed later. The connector 63 has as an integral portion thereof an outwardly projecting peripheral edge 116, which is received within slots provided in each of the housing parts 54A and 54B, in order to maintain the connector 63 in its proper position relative to the housing 54. A portion of the slot which receives the connector's peripheral edge 116 is visible at 117.

The housing parts 54A and 54B each have therein a recess of approximately rectangular shape, and one of these recesses is visible at 121 in FIG. 4. When the housing parts 54A and 54B are releasably coupled to each other, these two recesses cooperate to define within the cartridge 14 a substantially closed chamber 122 of approximately rectangular shape.

The cartridge 14 also includes an inner housing 128, which is smaller in size than the chamber 122 in the outer housing 54. The inner housing 128 has two flat surfaces 126 and 127 on opposite sides thereof, and has a side surface 129 which extends between peripheral edges of the surfaces 126 and 127. The surfaces 126 and 127 each have four corners, and thus the side surface 129 also has four corners. The inner housing 128 is resiliently supported within the chamber 122 by four resilient corner elements 131–134, the corner elements each having therein a recess which receives a respective corner of the inner housing 128. The inner housing 128 has within it a data storage medium in the form of a rotatable hard disk and associated support structure, as discussed in more detail later. The corner elements 131–134 are also discussed in more detail later.

Figure 5:
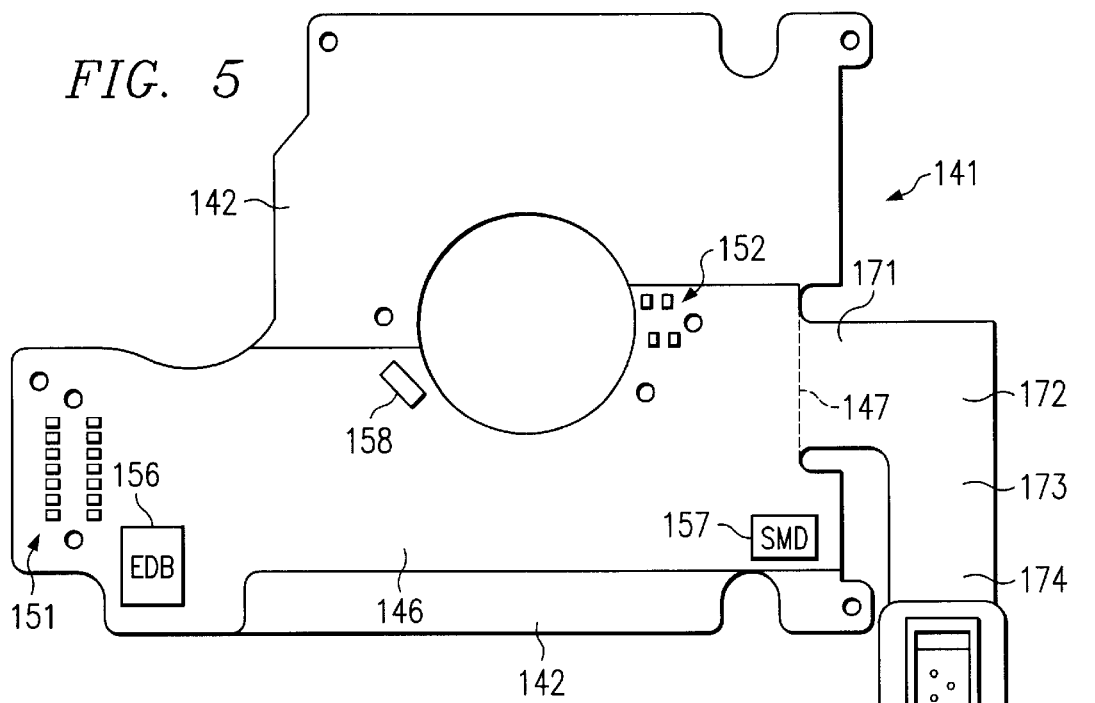
FIG. 5 is a diagrammatic front view of a circuit part which is a component of the cartridge of FIGS. 3–4, shown prior to installation of the circuit part into the cartridge.

The cartridge 14 includes a circuit part 141, which is shown in FIG. 4 and also in FIG. 5. FIG. 5 is a diagrammatic front view of the circuit part 141, showing this part as it appears before it is installed in the cartridge 14. The circuit part 141 includes a plate-like stiffener 142, which is an electrically insulating material. In the disclosed embodiment, the stiffener 142 is made from a plastic material, such as the material commonly known in the industry as CE-3. However, the stiffener 142 could alternatively be made from some other suitable material, such as the material from which printed circuit boards are commonly made. The stiffener 142 is fixedly mounted to the front side of the inner housing 128, for example by not-illustrated screws.

The circuit part 141 also includes a flex circuit 146, which has one portion that is disposed against and fixedly mounted to the front side of the stiffener 142, and which has another portion that is L-shaped and extends outwardly beyond an edge 147 of the stiffener 142, as discussed later. The portion of the flex circuit 146 which is mounted on the stiffener 142 has two sets of compression connector pads 151 and 152. Each set of compression connector pads 151 and 152 extends through the stiffener 142, so that these pads can electrically engage contacts of associated connector arrangements that are provided on the exterior of the inner housing 128, but that are not visible in the drawings or discussed here in detail. The portion of the flex circuit 146 mounted on the stiffener 142 also has thereon an electrostatic discharge buffer (EDB) 156, a secure memory device (SMD) 157, and a shock detector 158.

With reference to FIG. 5, the L-shaped portion of the flex circuit 146, which extends outwardly beyond the edge 147 of the stiffener 142, has the connector 63 soldered to the outer end thereof. When the circuit part 141 is installed into the cartridge 14 during assembly of the cartridge 14, this L-shaped portion of the flex circuit is bent to have the shape which is shown in FIG. 4. More specifically, after installation into the cartridge 14, the L-shaped portion of the flex circuit has a first portion 171 which extends outwardly from the stiffener 142 so as to be parallel thereto or at a small angle thereto, a second portion 172 which extends approximately perpendicular to the first portion 171, a third portion 173 at the outer end which extends approximately parallel to the second portion 172 and which has the connector 63 soldered thereto, and a fourth portion 174 which is disposed between the second and third portions 172 and 173 and which is bent to an approximately semi-cylindrical shape. The first portion 171 and the fourth portion 174 can each flex to permit limited movement of the inner housing 128 in any direction with respect to the connector 63. Thus, to the extent that the resilient elements 131–134 permit limited movement of the inner housing 128 within the outer housing 54, for example to absorb shocks, the portion of the flex circuit extending between the connector 63 and the inner housing 128 does not provide any significant resistance to movement of the inner housing 128 relative to the connector 63.

The flex circuit 146 has embedded therein a plurality of electrical conductors which are not visible in the drawings, but which electrically couple the various components mounted on the flex circuit 146, including the connectors 151–152, the connector 63, the EDB 156, the SMD 157, and the shock detector 158.

Figure 6:
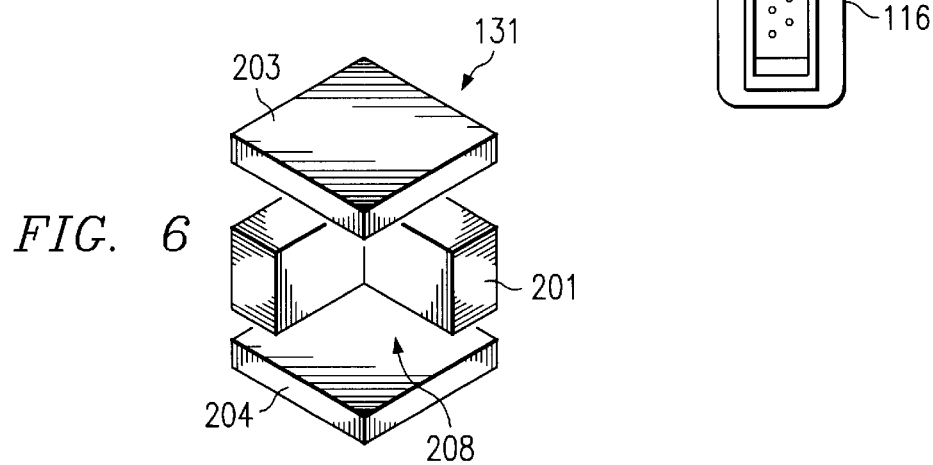
FIG. 6 is a diagrammatic exploded perspective view of a resilient element which is a component of the cartridge of FIGS. 3–4.
Figure 7:
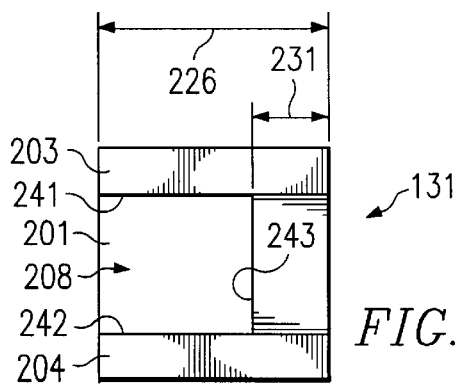
FIG. 7 is a diagrammatic elevational view of one side of the resilient element of FIG. 6.
Figure 8:
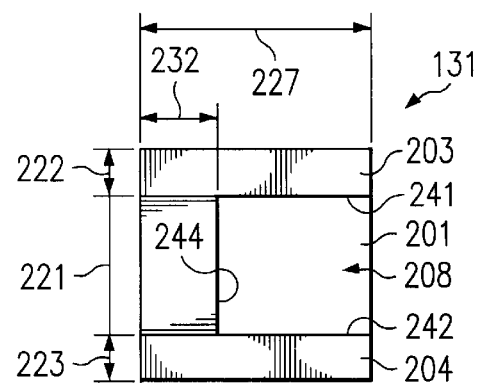
FIG. 8 is a diagrammatic elevational view of a different side of the resilient element of FIG. 6.

Turning in more detail to the resilient corner elements 131–134, the elements 131–134 are all identical, and therefore only the element 131 will be described below in detail. More specifically, FIG. 6 is a diagrammatic exploded perspective view of the resilient element 131, FIG. 7 is a diagrammatic elevational view of one side of the element 131, and FIG. 8 is a diagrammatic elevational view of a different side of the element 131. With reference to FIGS. 6–8, the resilient element 131 includes a center part 201 which is sandwiched between two identical outer parts 203 and 204. The center part 201 is approximately L-shaped, and the outer parts 203–204 are each a plate-like element of approximately square or rectangular shape. The L-shape of the center part 201 defines within the resilient element 131 a recess 208 which has approximately the shape of a cube.

As evident from FIG. 4, this recess 208 receives one of the corners of the inner housing 128 in the assembled state of the cartridge 14.

More specifically, with reference to FIGS. 7 and 8, it will be noted that the recess 208 in the resilient element 131 is defined by a surface 241 on the outer element 203, a surface 242 on the outer element 204, and two surfaces 243 and 244 provided on the inner sides of the respective legs of the L-shaped center part 201. When a respective corner of the inner housing 128 (FIG. 4) is received in the recess 208, the surfaces 241 and 242 of the element 131 respectively engage the surfaces 126 and 127 of the housing 128, and the surfaces 243 and 244 of the element 131 each engage the side surface 129 of the housing 128.

The center part 201 is made from a cellular urethane foam material that is available commercially under the trademark PORON® as part number 4701-50-15375-04 from Rogers Corporation of Woodstock, Conn. This foam material has characteristics that include a density of 15 lb/ft$^3$, a compression force deflection in the range of 8–14 psi, and a Durometer hardness of 18 Shore "O". The outer parts 203 and 204 are each made from a different cellular urethane foam material which is also available commercially under the trademark PORON® from Rogers Corporation, as part number 4701-50-20125-04. This foam material has characteristics which include a density of 20 lb/ft$^3$, a compression force deflection in the range of 13–23 psi, and a Durometer hardness of 24 Shore "O". The foam material used for the center part 201 is thus somewhat softer than the foam material used for the outer parts 203–204. The center part 201 has a Durometer hardness which is within a range of 13 to 23 Shore "O", and the outer parts 203–204 each have a Durometer hardness which is within a range of 19–29 Shore "O". The foam materials used for the parts 201 and 203–204 also have other desirable characteristics, such as minimal outgassing and high resistance to taking a compression set.

The outer parts 203 and 204 are each fixedly secured to the center part 201 using a known press sensitive adhesive (PSA), which in the disclosed embodiment is an acrylic PSA available commercially as part number 256M-74 from Adchem Company of Westbury, N.Y. This adhesive is applied only to the surface portions which are to be adhered to each other. Although the foregoing discussion sets forth specific foam materials and a specific adhesive, it will be recognized that it is possible to alternatively use other suitable materials and techniques for adhesion.

With reference to FIG. 8, the thickness 221 of the center part 201 is 9.5±0.95 mm. The thicknesses 222 and 223 of the outer parts 203 and 204 are the same, and in particular are each 3.18±0.32 mm. Thus, in the disclosed embodiment, the outer parts 203 and 204 each have a thickness which is approximately one-third the thickness of the center part 201.

With reference to FIGS. 7 and 8, the outer parts 203 and 204 each have respective dimensions 226 and 227 along two adjacent sides thereof. In the disclosed embodiment, the dimensions 226–227 are the same, with a value of 17±0.8 mm. It will be noted that the outer sides of the legs of the L-shaped center part 201 each have this same dimension. FIGS. 7 and 8 also show that the two legs of the L-shaped center part 201 each have a respective transverse thickness indicated at 231 or 232. In the disclosed embodiment, the thicknesses 231–232 are the same, and have a value of 6.35±0.5 mm. It will thus be noted that the transverse thickness 231 or 232 of each of the legs of the center part 201 is approximately twice the thickness 222 or 223 of either of the outer parts 203 and 204. Although the foregoing discussion sets forth certain specific dimensions of the corner part 131 from the disclosed embodiment, it will be recognized that the present invention is not limited to this specific set of dimensions.

Figure 9:
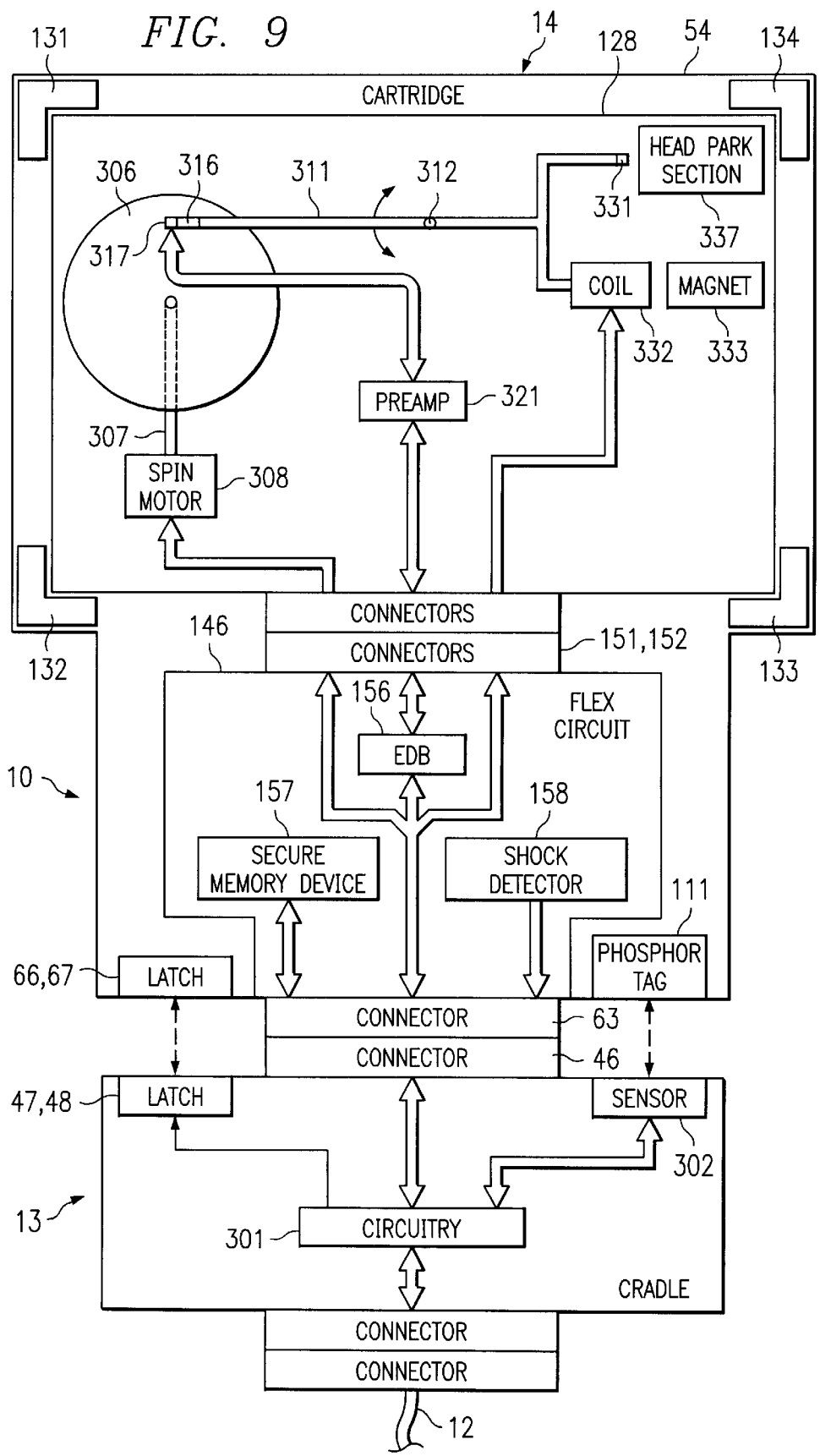
FIG. 9 is a block diagram of the device 10 of FIG. 1, showing selected internal components thereof.

FIG. 9 is a block diagram of the information storage device 10 of FIG. 1, showing in more detail the internal structure of this device. Parts which have already been discussed above in association with FIGS. 1–8 are identified with the same reference numerals in FIG. 9. The following discussion of FIG. 9 is directed primarily to other components that are shown in FIG. 9 but that have not already been discussed above.

More specifically, the cradle 13 includes some circuitry, which is shown diagrammatically here as a single block 301. The cradle 13 also includes a sensor section 302, which can interact with the phosphor tag 111 in order to identify certain characteristics of the phosphor tag, which in turn identifies certain characteristics of the cartridge 14. In this regard, the circuitry 301 can cause the sensor 302 to illuminate the phosphor tag 111 with a light emitting diode (LED), which is not illustrated. The LED is then turned off, and the phosphor tag 111 emits radiation it has absorbed from the LED. The circuitry 301 uses the sensor 302 to measure characteristics of the radiation emitted by the phosphor tag 111, such as its magnitude and rate of decay. The cradle 13 can deduce some knowledge about the cartridge 14 based on the information which it obtains from the phosphor tag 111. For example, one type of phosphor tag might be used for cartridges that have one level of storage capacity for data, and a different phosphor tag might be used for similar cartridges that have a higher level of storage capacity for data.

The inner housing 128 within the cartridge 14 contains a hard disk 306 which is mounted on a spindle 307. The spindle 307 can be rotatably driven by a spin motor 308. The disk 306 and spindle 307 together form a disk assembly. The spin motor 308 is controlled by signals received from the circuitry 301 through the connectors 46 and 63, the flex circuit 146, and a connector arrangement which includes the connectors 151 and 152. On the side surface of the hard disk 306 which is visible in FIG. 9, the disk 306 has a layer a known magnetic material, where digital information can be magnetically stored. An actuator arm 311 is supported for pivotal movement on the inner housing 128 by a bearing or bushing 312.

At one end, the actuator arm 311 has a suspension 316 which supports a read/write head 317, so that the head 317 is closely adjacent the surface the disk 306. The read/write head 317 is coupled to a preamplifier 321. The preamplifier 321 is coupled to the EDB on the flex circuit 146 through the connector arrangement that includes the connectors 151 and 152. The EDB 156 is in turn coupled through the connectors 63 and 46 to the circuitry 301 in the cradle. The EDB 156 is a commercially available device, which serves to electrically isolate the preamplifier 321 and the head 317 from the pins of the connector 63 when the cartridge 14 is not in the cradle 13. This protects the preamplifier 321 and the head 317 from possible damage due to electrostatic energy which originates external to the cartridge 14. When the cartridge 14 is disposed in the cradle 13, the EDB 156 electrically couples the preamplifier 321 and the read/write head 317 to the connector 63 and thus the circuitry 301.

The end of the actuator arm 311 remote from the head 317 is bifurcated to define two legs, one of which has a magnetically permeable part 331 at the outer end thereof, and the other of which has a coil 332 at the outer end thereof. The coil 332 receives electrical signals from the circuitry 301 in the cradle 13, through the connectors 63 and 46, the flex circuit 146, and the connector arrangement that includes the connectors 151 and 152. The coil 332 is located adjacent a stationary magnet 333. The electrical signals supplied to the coil 332 cause the coil to create an electromagnetic field, which interacts with the magnetic field of the magnet 333 as to effect pivotal movement of the actuator arm 311 about the pivot 312. The arm 311, head support 316, head 317, pivot 312, coil 332, and magnet 333 may be referred to as an actuator.

When the disk 306 is rotating at a normal operational speed, the rotation of the disk induces the formation, between the disk surface and the head 317, of an air cushion which is commonly known as an air bearing. Consequently, the head 317 floats on the air bearing while it is reading and writing information to and from the disk 306, without any direct physical contact with the disk. As the arm 311 is pivoted due to interaction between the coil 332 and the magnet 333, the head 317 moves approximately radially with respect to the disk. Thus, through relative movement of the head 317 and the disk 306 resulting from rotation of the disk 306 and also pivotal movement of the arm 311, the head 317 can be moved to a position aligned with any specific location on the operational portion of the surface of the disk 306.

When the disk 306 is at rest, the air cushion will not exist. Therefore, the head 317 is moved to a special region of the disk 306 at a radially inner portion thereof, adjacent to the spindle 307. This is commonly known as the park position of the head 317. Since the cartridge 14 may be subjected to significant shocks during time periods when it is not disposed within the cradle 13, a special parking arrangement is provided to help maintain the arm 311 and the head 317 in this park position. In this regard, and as previously mentioned, the arm 311 has a magnetically permeable part 331 thereon. A head park section 337, which includes a permanent magnet, is fixedly disposed within the inner housing 128 so as to be adjacent the magnetically permeable part 331 when the arm 311 and the head 317 are in the park position. The magnet in the head park section 337 and the magnetically permeable part 331 cooperate to yieldable resist pivotal movement of the arm 311 and the head 317 away from the park position.

If the cartridge 14 is dropped or otherwise subjected to a shock while it is withdrawn from the cradle 13, the resilient elements 131–134 help reduce the magnitude of that shock as it is being transferred to the inner housing 128 containing the hard disk 306 and the head 317. The resilient elements 131–134 thus help reduce the likelihood that the shock will cause physical damage to the hard disk 306, the head 317, or other components within the inner housing 128. Further, by maintaining the arm 311 and the head 317 in the park position while the cartridge 14 is withdrawn from the cradle 13, the head park section 337 and the magnetically permeable part 331 help to reduce the likelihood of damage to the head 317 and the hard disk 306 if the cartridge 14 is subjected to a shock.

In the event the cartridge 14 is subjected to a shock, the shock detector 158 on the flex circuit 146 can detect and record the occurrence of that shock if it is in excess of a threshold value. The shock detector 158 is a commercially available component, for example part number PKGF-25ME-TC sold by Murata Electric of North America, located in State College, Pa. When the cartridge 14 is later inserted into the cradle 13, the circuitry 301 can interact electrically with the shock detector 158 in order to determine whether the cartridge 14 has been subjected to a significant shock.

Figure 10:
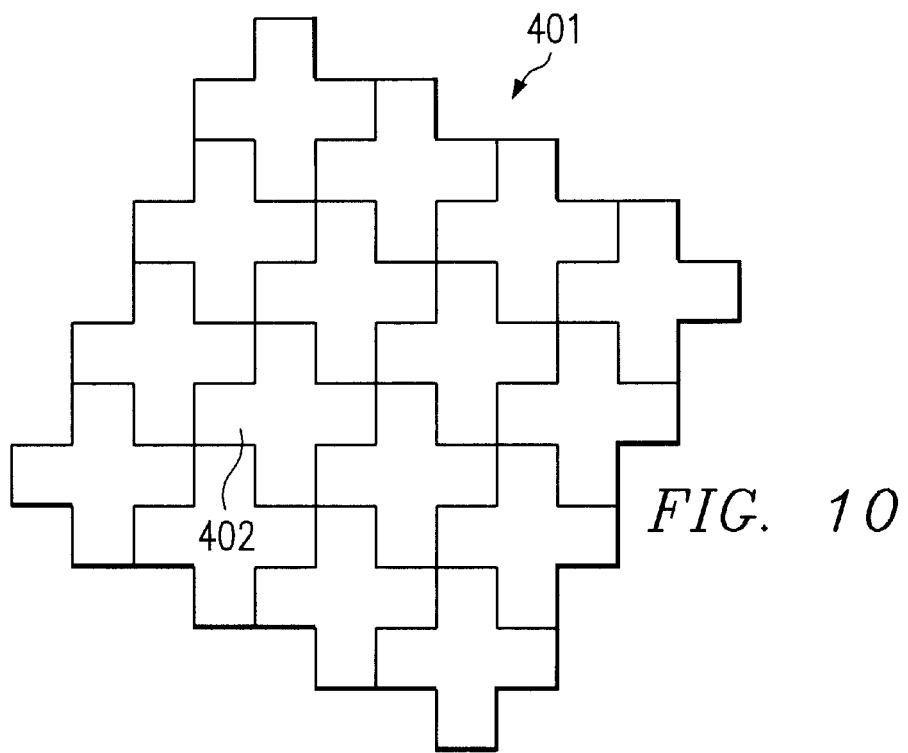
FIG. 10 is a diagrammatic top view of part of a sheet of resilient foam material, showing a pattern for cutting it into a plurality of identical cross-shaped parts that can each be used in the fabrication of resilient elements of the type shown in FIG. 6.
Figure 11:
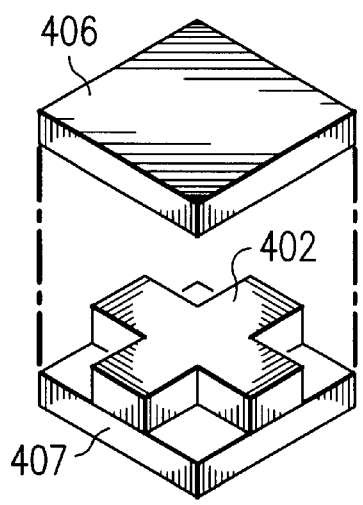
FIG. 11 is a diagrammatic exploded perspective view of an assembly which includes one of the cross-shaped foam parts of FIG. 10 sandwiched between two square foam parts.
Figure 12:
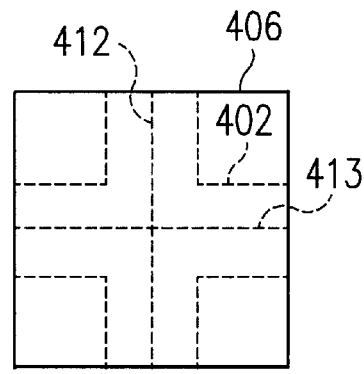
FIG. 12 is a diagrammatic top view of the assembly of FIG. 11, showing two cutting planes which will effect subdivision of this assembly into four resilient elements of the type shown in FIG. 6.

FIGS. 10–12 depict successive steps in a process for efficiently making the corner elements 131–134. FIG. 10 is a diagrammatic top view of part of a large sheet of the type of foam material used to make the center parts 201 of each of the resilient elements 131–134. This sheet is cut into a plurality of cross-shaped parts according to the cutting pattern shown in FIG. 10, one of these cross-shaped parts being indicated at 402. It will be noted from FIG. 10 that, by cutting many cross-shaped parts from the sheet 401 using the indicated cutting pattern, virtually all the material of the sheet 10 ends up being used for the cross-shaped parts, with no significant amount of wasted foam material.

Turning to FIG. 11, a further sheet of foam material, which is the type of foam material used to make the outer parts 203 and 204, is cut into a plurality of square parts, two of which are shown at 406 and 407 in FIG. 11. It will be recognized that many such square parts can be cut from a single sheet of foam material, with little or no wasted foam material. The parts 406 and 407 are then adhesively secured to opposite sides of the cross-shaped part 402, in the manner depicted in FIG. 11. This is carried out using the pressure sensitive adhesive discussed above. As mentioned above, the adhesive is applied only to the surfaces on the parts 402 and 406–407 which will be secured to each other.

Later, after the adhesive has dried or cured, the resulting assembly is cut along a plane corresponding to line 412, and also along a plane corresponding to line 414, as shown in FIG. 12. This divides the assembly into four parts, each of which is a respective one of the resilient elements shown at 131–134 in FIG. 4. The process just described provides a rapid and efficient technique for making the resilient elements 131–134, in a manner that involves almost no waste of foam material.

The present invention provides a number of technical advantages. One such technical advantage is that a hard disk drive mechanism within a movable cartridge is provided with excellent protection from physical shocks. In this regard, the resilient elements which support the inner housing for the hard disk drive mechanism include portions made from different types of material so as to provide different levels of resilience in different directions.

A further advantage results from the use of the flex circuit to couple the inner housing to the connector on the outer housing, thereby minimizing the extent to which mechanical shock or vibration is coupled from the outer housing to the inner housing as a result of the need to provide electrical conductivity from the inner housing to the connector. This also avoids stress concentrations in the electrical links extending between the inner housing and connector through the flex circuit.

A further advantage of the flex circuit is that it provides an easy way to add additional electric components to the cartridge, such as an electrostatic discharge buffer, a secure memory device, and/or a shock detector. A further advantage relates to the fact that a portion of the flex circuit is mounted on a plate-like stiffener, which provides support for compression connectors on the flex circuit, and provides a rigid flat surface that the pads of the compression connectors can push against.

Another advantage relates to the fact that the resilient elements are physically configured so that they provide suitable resilient support for the inner housing, but have a relatively minimal amount of contact with the exterior surface area of the inner housing, so as to maximize the amount of the surface area of the inner housing which is available for convection cooling. In other words, the resilient elements are configured so that they do not act as a blanket around the inner housing. Consequently, the inner housing can more efficiently discharge heat, which in turn allows the components within the inner housing to operate at cooler temperatures, thereby increasing their effective operational lifetimes. The resilient elements also facilitate assembly of the cartridge, because they are simply placed on the four corners of the inner housing, and then the inner housing is placed within the cartridge shell.

A further advantage of the present invention relates to the fact that the resilient elements can be manufactured in a simple and efficient manner which minimizes the amount of foam material that needs to be discarded. In more detail, one layer of foam material is cut to the shape of a cross, and two other layers of foam material are each cut to a square or rectangular shape, and then these three layers are laminated together. Then, two different cuts are made to the laminated assembly in order to create the four resilient elements needed for one cartridge. A related advantage comes from the fact that the layers are cut from sheets of foam material, because the range of foam materials available commercially in sheet form is much larger than the range of foam materials available commercially in a thermally formable form.

Although selected embodiments have been illustrated and described in detail, it will be recognized that a variety of substitutions and alterations can be made therein without departing from the spirit and scope of the present invention, as defined by the following claims.

What is claimed is:

1. An apparatus comprising a removable data storage cartridge which includes:

an outer housing having a chamber therein;

an inner housing which is smaller than and disposed within said chamber, said inner housing having first and second surface portions on opposite sides of the exterior thereof, and having on the exterior thereof a side surface portion which extends between peripheral edges of said first and second surface portions;

a plurality of resilient elements disposed within said chamber between said inner and outer housings so as to resiliently support said inner housing with respect to said outer housing, said resilient elements being disposed at spaced locations along a periphery of said inner housing, and each including first and second outer portions coupled to opposite sides of a center portion, said center portion engaging said side surface portion of said inner housing and said first and second outer portions respectively engaging said first and second surface portions of said inner housing, said center portion being made from a material having a first compression characteristic, said first outer portion being made from a material having a second compression characteristic different from said first compression characteristic, and said second outer portion being made from a material having a third compression characteristic different from said first compression characteristic;

a data storage portion disposed within said inner housing; and a section which transports signals that include data between said data storage section and a location external to said outer housing.

2. An apparatus according to claim 1, wherein said section includes a flexible portion which is disposed between said inner housing and said outer housing, and which flexes to facilitate movement of said inner housing relative to said outer housing.

3. An apparatus according to claim 1, wherein each said resilient element has each of said outer portions thereof coupled to said center portion thereof by an adhesive.

4. An apparatus according to claim 3, including a connector supported on said outer housing and accessible from externally of said outer housing, said flexible portion of said section including a flex circuit which is electrically coupled to said connector.

5. An apparatus according to claim 1, wherein said center and outer portions of each said resilient element are each made from a foam material.

6. An apparatus according to claim 1,
wherein said center portion of each said resilient element is compressible in a first direction and said outer portions thereof are compressible in a second direction approximately perpendicular to said first direction; and
wherein said first, second and third compression characteristics include said center portion being more easily compressible in said first direction than said outer portions in said second direction.

7. An apparatus according to claim 1, wherein said first, second and third compression characteristics include said center portion of each said resilient element being more easily compressible than each of said outer portions thereof.

8. An apparatus according to claim 7, wherein said first compression characteristic includes said center portion of each said resilient element having a Durometer hardness in the range of approximately 13 to 23 Shore "O", and said second and third compression characteristics include each of said outer portions of each said resilient element having a Durometer hardness in the range of approximately 19 to 29 Shore "O".

9. An apparatus according to claim 8, wherein said center portion of each said resilient element has a Durometer hardness of approximately 18 Shore "O", and each of said outer portions of each said resilient element has a Durometer hardness of approximately 24 Shore "O".

10. An apparatus according to claim 9, wherein for each of said resilient elements a minimum thickness between said inner and outer housings of said center portion thereof is approximately twice a minimum thickness between said inner and outer housings of each of said outer portions thereof.

11. An apparatus according to claim 1, wherein each of said outer portions of each said resilient element has a part thereof which projects outwardly beyond said center portion of the resilient element in a direction toward a central region of said inner housing.

12. An apparatus according to claim 11,
wherein said first and second surface portions and said side surface portion of said inner housing each have a plurality of corners, and
wherein each said resilient element cooperates with said inner housing in the region of a respective said corner of each of said first surface portion, said second surface portion, and said side surface portion.

13. An apparatus according to claim 12, wherein said center portion of each said resilient element has approximately an L-shape, and each of said outer portions of each said resilient element has approximately a rectangular shape.

14. An apparatus according to claim 1, wherein said data storage portion disposed within said inner housing includes a rotatably supported hard disk having a magnetic surface on one side thereof, and includes a head supported for movement adjacent a surface of said disk for facilitating a transfer of data through said section between said disk and a circuit external to said outer housing.

15. A method comprising the steps of:
providing a data storage portion within an inner housing, said inner housing having first and second surface portions on opposite sides of the exterior thereof, and further having on the exterior thereof a side surface portion which extends between peripheral edges of said first and second surface portions;
locating said inner housing in a chamber within an outer housing, said inner housing being smaller than said chamber;
transporting signals that include data between said data storage portion and a location external to said outer housing; and
resiliently supporting said inner housing within said chamber in said outer housing using a plurality of resilient elements disposed within said chamber, said resiliently supporting step including the steps of:
positioning said resilient elements at spaced locations along a periphery of said inner housing;
configuring each of said resilient elements to include first and second outer portions which are coupled to opposite sides of a center portion;
causing said center portion to engage said side surface portion of said inner housing and said first and second outer portions to respectively engage said first and second surface portions of said inner housing;
selecting for said center portion a material having a first compression characteristic;
selecting for said first outer portion a material having a second compression characteristic different from said first compression characteristic; and
selecting for said second outer portion a material having a third compression characteristic different from said first compression characteristic.

16. A method according to claim 15,
including the step of configuring each said resilient element so that said center portion thereof is compressible in a first direction and said outer portions thereof are compressible in a second direction approximately perpendicular to said first direction; and
wherein said selecting steps are carried out so that said first, second and third compression characteristics include said center portion being more easily compressible in said first direction than said outer portions in said second direction.

17. A method according to claim 15, wherein said selecting steps are carried out so that said first, second and third compression characteristics include said center portion of each said resilient element being more easily compressible than each of said outer portions thereof.

18. A method according to claim 15, including the step of configuring each said resilient element so that each of said outer portions thereof has a part which projects outwardly beyond said center portion thereof in a direction toward a central region of said inner housing.

19. A method according to claim 18,
including the step of configuring said inner housing so that said first and second surface portions thereof and said side surface portion thereof each have a plurality of corners; and
wherein said positioning step includes the step of causing each said resilient element to cooperate with said inner housing in the region of a respective said corner of each of said first surface portion, said second surface portion, and said side surface portion.

20. A method according to claim 15, including the step of selecting as said data storage portion a mechanism which includes a rotatably supported hard disk having a magnetic surface on one side thereof, and a head supported for movement adjacent a surface of said disk.

* * * * *